(12) United States Patent
Kim et al.

(10) Patent No.: US 9,524,402 B2
(45) Date of Patent: Dec. 20, 2016

(54) DISPLAY APPARATUS AND CONTROL METHOD THEREOF

(71) Applicant: SAMSUNG ELECTRONICS CO., LTD., Suwon-si (KR)

(72) Inventors: Tae-hoon Kim, Suwon-si (KR); Tae-je Park, Suwon-si (KR); Tae-hyeun Ha, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/570,265

(22) Filed: Dec. 15, 2014

(65) Prior Publication Data

US 2015/0213290 A1 Jul. 30, 2015

(30) Foreign Application Priority Data

Jan. 29, 2014 (KR) .................. 10-2014-0011529

(51) Int. Cl.
*G06F 21/00* (2013.01)
*G06F 1/26* (2006.01)
(Continued)

(52) U.S. Cl.
CPC .............. *G06F 21/84* (2013.01); *G06F 1/26* (2013.01); *G06F 21/81* (2013.01); *G06F 21/55* (2013.01);
(Continued)

(58) Field of Classification Search
CPC ........ G06F 21/554; G06F 21/86; G06F 21/55; G06F 21/81; G06F 21/70; G06F 21/88; G06F 21/84; G06F 21/56; H04L 63/1416; H04L 9/003
(Continued)

(56) References Cited

U.S. PATENT DOCUMENTS 7,877,621 B2  1/2011  Jacoby et al.
2006/0242441 A1*  10/2006  Yoon .................. G06F 1/3215
                                                            713/320
(Continued)

FOREIGN PATENT DOCUMENTS

KR    10-1147645 B1    7/2012

OTHER PUBLICATIONS

Search Report dated Apr. 13, 2015 issued by the International Searching Authority in counterpart International Patent Application No. PCT/KR2015/000317 (PCT/ISA/210).
(Continued)

*Primary Examiner* — Alexander Lagor
(74) *Attorney, Agent, or Firm* — Sughrue Mion, PLLC

(57) ABSTRACT

A display apparatus is provided that including a display configured to display content. The display apparatus also includes a main controller configured to control operation of the display, a power supplier configured to supply power to operate the display and the main controller, a power measurer configured to measure the power supplied by the power supplier, a storage configured to store information regarding a third power range which is between a first power range that the display apparatus consumes in a sleep state and a second power range that the display apparatus consumes in a normal state, and a power controller configured to cut off the power supplied by the power supplier in response to the measured power being within the third power range.

14 Claims, 7 Drawing Sheets

| POWER RANGE | CONDITIONS | | STATE(MODE) |
|---|---|---|---|
| 0~1[W] | DISPLAY | TURNED OFF | SLEEP STATE |
| | CAMERA | TURNED OFF | |
| 1~30[W] | DISPLAY | TURNED OFF | HACKED STATE |
| | CAMERA | TURNED ON | |
| 30~200[W] | DISPLAY | TURNED ON OR | NORMAL OPERATING STATE |
| | CAMERA | TURNED ON | |
| | DISPLAY | TURNED ON | |
| | CAMERA | TURNED OFF | |

(51) Int. Cl.
*G06F 11/30* (2006.01)
*G06F 12/14* (2006.01)
*G06F 21/84* (2013.01)
*G06F 21/81* (2013.01)
*G06F 21/55* (2013.01)
*G06F 21/56* (2013.01)
*G06F 21/88* (2013.01)
*G06F 21/70* (2013.01)

(52) U.S. Cl.
CPC ............... *G06F 21/56* (2013.01); *G06F 21/70* (2013.01); *G06F 21/88* (2013.01)

(58) Field of Classification Search
USPC .......... 726/22, 23, 34, 36, 24; 713/194, 300, 713/330, 340
See application file for complete search history.

(56) References Cited

U.S. PATENT DOCUMENTS

| | | |
|---|---|---|
| 2008/0040804 A1 | 2/2008 | Oliver et al. |
| 2012/0167218 A1 | 6/2012 | Poornachandran et al. |
| 2013/0110423 A1 | 5/2013 | Zimmermann et al. |
| 2014/0359337 A1* | 12/2014 | Tong ..................... G06F 1/266 713/340 |

OTHER PUBLICATIONS

Written Opinion dated Apr. 13, 2015 issued by the International Searching Authority in counterpart International Patent Application No. PCT/KR2015/000317 (PCT/ISA/237).

* cited by examiner

FIG. 4

| POWER RANGE | CONDITIONS | | STATE(MODE) |
|---|---|---|---|
| 0~1[W] | DISPLAY<br>CAMERA | TURNED OFF<br>TURNED OFF | SLEEP STATE |
| 1~30[W] | DISPLAY<br>CAMERA | TURNED OFF<br>TURNED ON | HACKED STATE |
| 30~200[W] | [DISPLAY<br>CAMERA<br>[DISPLAY<br>CAMERA | TURNED ON]<br>TURNED ON] OR<br>TURNED ON ]<br>TURNED OFF] | NORMAL<br>OPERATING<br>STATE |

DISPLAY APPARATUS AND CONTROL METHOD THEREOF

CROSS-REFERENCE TO RELATED APPLICATION

This application claims priority from Korean Patent Application No. 10-2014-0011529, filed in the Korean Intellectual Property Office on Jan. 29, 2014, the disclosure of which is incorporated herein by reference in its entirety.

BACKGROUND

Technical Field

Apparatuses and methods consistent with exemplary embodiments relate to a display apparatus and a control method thereof, and more particularly, to a display apparatus capable of cutting off the power supply according to power consumption of the display apparatus, and a control method thereof.

Description of the Related Art

Along with recent technological developments, display apparatuses have been developed and launched which adopt diverse functionality. The display apparatuses include mobile phones, smart phones, tablet computers, laptop computers, smart televisions (TVs), internet protocol televisions (IPTVs), digital cameras, camcorders, wearable technology such as watches and glasses, etc. The display apparatuses may not only display digital content such as images but may also run a diverse selection of applications.

Further, many of the display apparatuses have a display unit and a photographic unit, thereby supporting a videography function and/or a photographing function. For example, a display apparatus that supports a photographing function may display a live view on the display unit using light incident through a lens so that a user may watch a displayed live view and take a photograph or video at the same time.

However, in this case, when the display apparatus is hacked into, a hacking program may drive the display apparatus. In particular, the hacked display apparatus may activate the photographing unit regardless of the user's intention and transmit photographed image data to an external device. In this case, the hacked display apparatus may mostly deactivate a component that informs the user that the photographing unit is activated so that the user may not know that the display apparatus is taking photographs.

In response to this case, attempts to prevent hacking using software have been tried. However, hacking programs are updated in response to antivirus programs, and therefore it is difficult to prevent hacking using antivirus programs. Accordingly, there is a need for preventing hacking in terms of hardware.

SUMMARY

Exemplary embodiments may overcome the above disadvantages and other disadvantages not described above. Also, the present invention is not required to overcome the disadvantages described above, and an exemplary embodiment may not overcome any of the problems described above.

One or more exemplary embodiments provide a display apparatus capable of suspending a hacked state or an abnormal state by cutting off the power supply when measured electrical power is within a range of electrical power consumed in the hacked state or the abnormal state, and a control method thereof.

According to an aspect of an exemplary embodiment, there is provided a display apparatus including a display configured to display content, a main controller configured to control operation of the display, a power supplier configured to supply power to operate the display and the main controller, a power measurer configured to measure the power supplied by the power supplier, a storage configured to store information regarding a third power range which is between a first power range that the display apparatus consumes in a sleep state and a second power range that the display apparatus consumes in a normal state, and a power controller configured to cut off the power supplied by the power supplier in response to the measured power being within the third power range.

The display apparatus may further include a timer configured to measure a time elapsed from when the measured power is within the third power range, wherein the power controller is further configured to cut off the power supplied by the power supplier in response to the time measured by the timer exceeding a critical time.

The display apparatus may further include a switch configured to electrically connect the main controller and the power supplier, wherein the power controller is further configured to turn off the switch to electrically disconnect the main controller and the power supplier in response to the measured power being within the third power range.

The first power range may be measured when the display and the main controller are turned off, wherein the second power range may be measured when the display and the main controller are turned on, and wherein the third power range may be measured when the display is turned off and the main controller is turned on.

The display apparatus may further include a camera configured to take a photograph, wherein the third power range is a power range that the display apparatus consumes when the camera is activated.

The display apparatus may further include a communicator configured to communicate with an external device, wherein the third power range is a power range that the display apparatus consumes when the camera and the communicator are activated.

According to an aspect of another exemplary embodiment, there is provided a control method of a display apparatus, the method including measuring power supplied to the display apparatus, and cutting off the supplied power in response to the measured power being within a third power range which is between a first power range that the display apparatus consumes in a sleep state and a second power range that the display apparatus consumes in a normal state.

The method may further include measuring a time elapsed from when the measured power is within the third power range, wherein the cutting off the supplied power includes cutting off the supplied power in response to the measured time exceeding a critical time.

The first power range may be measured when a display configured to display content and a main controller configured to control the display are turned off, wherein the second power range may be measured when the display and the main controller are turned on, and wherein the third power range may be measured when the display is turned off and the main controller is turned on.

The method may further include taking a photograph of an external object using a camera, wherein the third power range is a power range that the display apparatus consumes when the camera is activated.

The method may further include communicating with an external device, wherein the third power range is a power range that the display apparatus consumes when the camera and the communicator are activated.

BRIEF DESCRIPTION OF THE DRAWINGS

The above and/or other aspects will become apparent and more readily appreciated from the following description of exemplary embodiments taken in conjunction with the accompanying drawings, in which:

FIG. 4 shows the states of the display apparatus according to another exemplary embodiment;

DETAILED DESCRIPTION OF THE EXEMPLARY EMBODIMENTS

Figure 1:
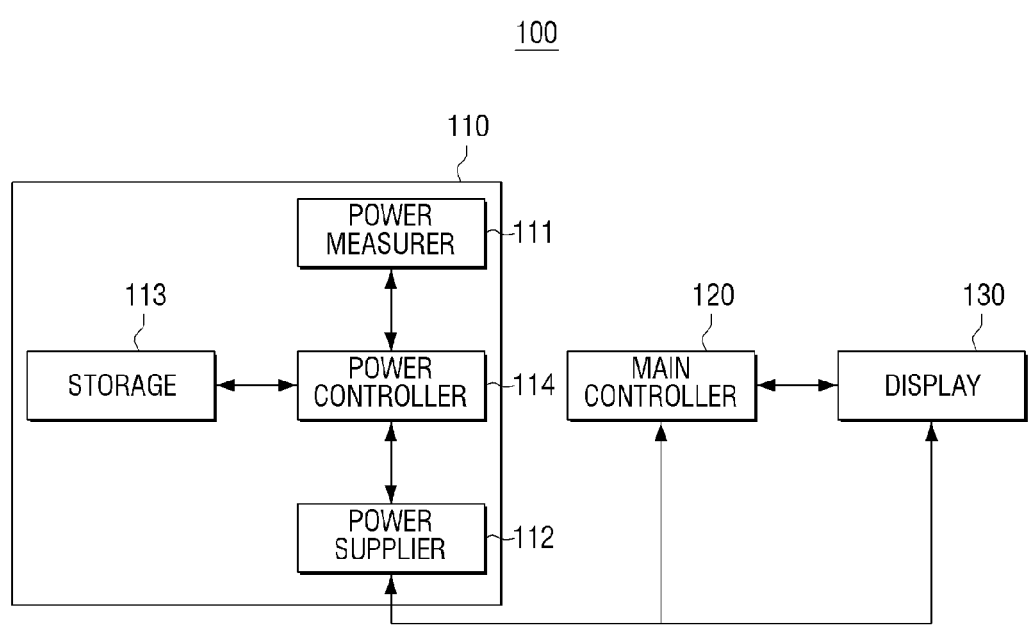
FIG. 1 is a block diagram of a configuration of a display apparatus according to an exemplary embodiment.

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of exemplary embodiments. Thus, it is apparent that the exemplary embodiments can be carried out without those specifically defined matters. Also, functions or constructions known in the related art are not described in detail because they would obscure the exemplary embodiments with unnecessary detail.

FIG. 1 is a block diagram of a configuration of a display apparatus 100 according to an exemplary embodiment.

With reference to FIG. 1, the display apparatus 100 may include a power unit 110, a main controller 120, and a display 130. The display apparatus 100 may be implemented with diverse kinds of apparatuses such as a mobile phone, a smart phone, a tablet computer, a laptop computer, a smart television (TV), an internet protocol television (IPTV), a digital camera, a camcorder, and wearable devices such as watches and glasses.

The power unit 110 controls the power supply to the main controller 120. The main controller 120 controls operation of the display 130 and other components of the display apparatus using electrical power supplied from the power unit 110.

In addition, the power unit 110 controls the power supply to the display 130. In this case, the power unit 110 may include a display driver to drive the display 130. In addition, when the display 130 includes a backlight, the power unit 110 may further include a backlight driver.

The main controller 120 controls overall operation of the display apparatus 100. Specifically, the main controller 120 receives electrical power from the power unit 110, and thereby controls operation of the display apparatus 100.

The display 130 displays content. More specifically, the display 130 receives electrical power from the power unit 110, and displays content according to control by the main controller 120.

According to an exemplary embodiment, the power unit 110 may include a power measurer 111, a power supplier 112, a storage 113, and a power controller 114.

The power supplier 112 supplies electrical power to operate the display apparatus 100. The power supplier 112 is connected to the power controller 114 to supply power to the main controller 120 and the display 130 according to control by the power controller 114. That is, when the power supplier 112 receives a power supply signal from the power controller 114, the power supplier 112 supplies power to the main controller 120 and the display 130, and when the power supplier 112 receives a power cutoff signal from the power controller 114, the power supplier 112 cuts off the power supply to the main controller 120 and/or the display 130.

The power controller 114 controls the distribution of the power supply to the main controller 120 and the display 130. Further, the power controller 114 may control the distribution of power to other components of the display apparatus 100 which are not shown in FIG. 1.

The power measurer 111 measures power supplied by the power supplier 112. As shown in FIG. 1, the power measurer 111 is connected to the power controller 114, and measures power that the power supplier 112 supplies to the main controller 120 and the display 130. Alternatively, according to another exemplary embodiment, the power measurer may be also, or may be exclusively, connected directly to the power supplier and measure the power output by the power supplier directly.

The storage 113 stores information regarding a power range corresponding to a power supply state of the power supplier 112. Specifically, the storage 113 may store information regarding a first power range, a second power range, and a third power range. The first power range is a power range that the display apparatus 100 consumes in a sleep state. The second power range is a power range that the display apparatus 100 consumes in a normal operating state. The third power range is a power range that the display apparatus 100 consumes in a hacked state or an abnormal state. These power ranges will be described later in greater detail.

The power controller 114 controls operation of the power supplier 112 using information regarding the power ranges stored in the storage 113 and electrical power measured by the power measurer 111.

Specifically, information regarding the first power range stored in the storage 113 is power information regarding the display apparatus 100 in the sleep state. The sleep state may refer to a standby mode, in which the display apparatus 100 is in a soft power-off state. In other words, the sleep state is a state in which the main controller 120 and the display 130 are deactivated. The first power range may be a power range measured when the display 130 and the main controller 120 are turned off.

Information regarding the second power range stored in the storage 113 is power information regarding the display apparatus 100 in the normal operating state. The normal operating state is a state in which the display apparatus 100 normally operates. In other words, the normal operating state may be a state in which the display 130 displays content according to control of the main controller 120.

Accordingly, the second power range may be a power range measured when the display 130 and the main controller 120 are turned on.

When the display apparatus 100 is hacked into, the main controller 120 controls the components of the display apparatus 100 in accordance with an installed hacking program. In this case, in order to conceal the hacked state of the display apparatus 100 from the user, the hacked main controller 120 may turn off the display 130 in operation. That is, in the hacked state, the main controller 120 is turned on and the display 130 is turned off.

Accordingly, in order to get out of the hacked state, the power controller 114 may interrupt operation of the hacking program by cutting off the power supply to the components of the display apparatus 100. In other words, when power measured by the power measurer 111 is included in a power range of a state in which the display 130 is turned off and the main controller 120 is turned on, the power controller 114 may control the power supplier 112 to cut off the power supply. In this case, when the display 130 is turned off and the main controller 120 is turned on, power measured by the power measurer 111 may be the third power range. The third power range may be between the first power range and the second power range.

In other words, when power consumed by the display apparatus 100 is within a power range of the hacked state, the power controller 114 cuts off the power supply to the main controller 120 and the display 130 so that operation of the hacking program may be halted.

Figure 2:
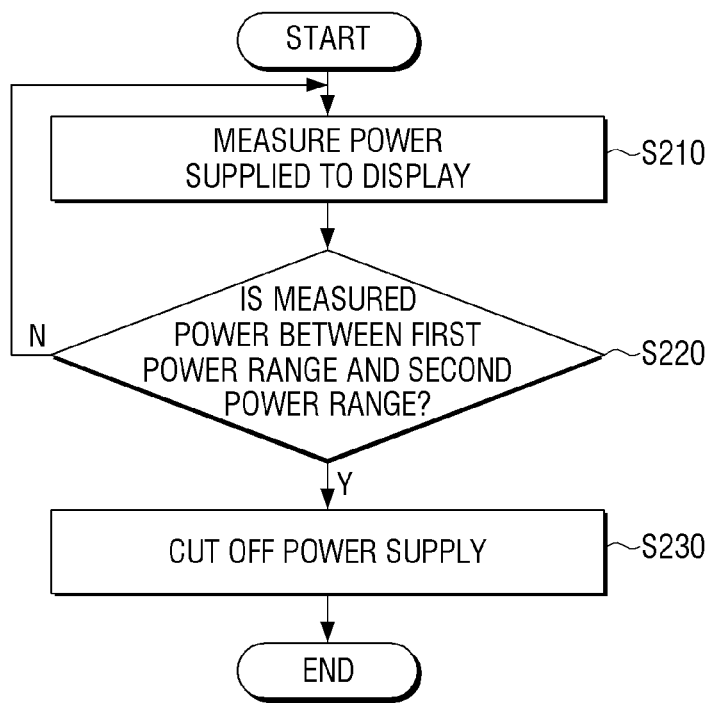
FIG. 2 is a flow chart of a control method of the display apparatus according to an exemplary embodiment.

FIG. 2 is a flow chart of a control method of the display apparatus according to an exemplary embodiment. Description of a portion which overlaps with the aforementioned description is not repeated here.

The power measurer 111 measures power supplied to the components of the display apparatus 100 (S210).

Subsequently, the power controller 114 determines whether the measured power is between the first power range and the second power range (S220). Specifically, the power controller determines if the measured power is greater than the first power range and less than the second power range which is the range of power defined as the third power range. In this case, information regarding the first power range and information regarding the second power range may be pre-stored in the storage 113. Alternatively, the first power range and the second power range information may be provided from an external source.

Further, according to another exemplary embodiment, the power controller may determine whether the power is between the first and second power ranges by a detection signal provided by the power measurer. This signal may be generated by the power measurer by having a hardwired circuit that generates the detection signal when the measured power falls within the third range only.

Information regarding the first power range is power information regarding the display apparatus 100 in the sleep state. The sleep state is a state in which the display apparatus 100 is deactivated. The first power range may be a power range measured when the display 130 and the main controller 120 are turned off.

Information regarding the second power range is power information regarding the display apparatus 100 in the normal operating state. The normal operating state is a state in which the display apparatus 100 normally operates. The second power range may be a power range measured when the display 130 and the main controller 120 are turned on.

Accordingly, when the measured power is not between the first power range and the second power range (S220_N), the power controller 114 maintains the power supply (S210).

When the measured power is between the first power range and the second power range (S220_Y), it is determined that the display apparatus 100 is in the abnormal state, that is, in a state operated by a hacking program. In the hacked state, the main controller 120 may be turned on, and the display 130 may be turned off. Accordingly, in order to get out of the hacked state, the power controller 114 may control the power supplier 112 to cut off the power supply. That is, when the measured power is between the first power range and the second power range (S220_Y), the power controller 114 controls the power supplier 112s to cut off the power supply (S230).

Figure 3:
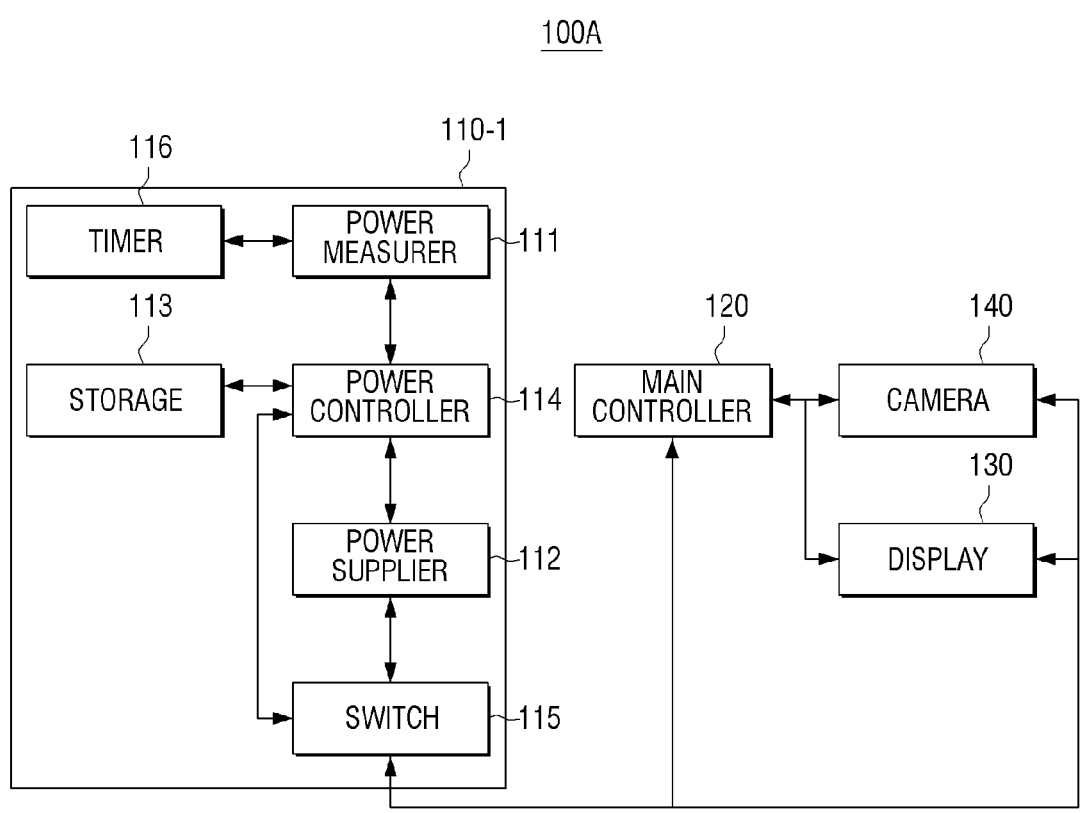
FIG. 3 is a block diagram of a configuration of a display apparatus according to another exemplary embodiment.

FIG. 3 is a block diagram of a configuration of a display apparatus 100A according to another exemplary embodiment. With reference to FIG. 3, the display apparatus 100A may further include a timer 116, a switch 115, and a camera 140. Description of a portion which overlaps with the description given with reference to FIG. 1 is not repeated here.

The power unit 110-1 may further include the timer 116. The timer 116 may measure a time elapsed from when power measured by the power measurer 111 falls within the third power range.

Further, when a time measured by the timer 116 is equal to or less than a predetermined critical time, the power controller 114 controls the power supplier 112 to continue supplying power to the components of the display apparatus 100A despite the supplied power falling within the third power range. In this case, the power controller 114 may turn on the switch 115. However, once the time measured by the timer 116 is longer than the predetermined critical time, the power controller 114 controls the power supplier 112 to cut off the power supply to the components of the display apparatus 100A. In this case, the power controller 114 may turn off the switch 115.

For example, when power measured by the power measurer 111 is in the third power range, but a time measured by the timer 116 is equal to or less than the predetermined critical time, the power controller 114 turns on the switch 115 to supply power to the components of the display apparatus 100A. In addition, when power measured by the power measurer 111 is in the third power range and a time measured by the timer 116 exceeds the predetermined critical time, the power controller 114 cuts off the power supply.

The power unit 110-1 may further include the switch 115. In this case, the switch 115 may include diverse kinds of switches such as a field effect transistor (FET), a transistor, a single pole single through (SPST), a single pole double through (SPDT), a double pole double through (DPDT), and a relay.

The switch 115 is electrically connected to the power controller 114 to perform switching according to a control signal from the power controller 114. In addition, the switch 115 is located at an output terminal of the power supplier 112 in order to permit the transfer power from the power supplier 112 to the main controller 120, the display 130, and the camera 140, or in order to cut off the power supply to the main controller 120, the display 130, and the camera 140. Accordingly, when the power controller 114 turns on the switch 115, the power supplier 112 supplies power to the main controller 120, the display 130, and the camera 140. Further, when the power controller 114 turns off the switch 115, the power supplier 112 does not supply power to the main controller 120, the display 130, and the camera 140.

According to another exemplary embodiment, when power measured by the power measurer 111 is in the third power range, the power controller 114 turns off the switch 115. In other words, when power measured by the power measurer 111 is between the first power range corresponding to the sleep state of the display apparatus 100A and the second power range corresponding to the normal operating state of the display apparatus 100A, the power controller 114 turns off the switch 115 and thus cuts off the power supply.

The display apparatus 100A may further include the camera 140. The camera 140 may take a photograph or a video of an external object.

Specifically, the camera 140 is mounted in the display apparatus 100A and takes a photograph of an external object creating an image. The image of the external object may be a still image or a moving image. In addition, a plurality of cameras 140 such as a front camera mounted on the front of the display apparatus 100A, a side camera mounted on the side of the display apparatus 100A, and a back-facing camera mounted on the back side of the display apparatus 100A may be provided.

When the display apparatus 100A is hacked into, a hacking program may be generally installed in a main processor. Accordingly, the hacking program may be installed in the main controller 120 rather than the power controller 114. Therefore, the hacked main controller 120 controls the components of the display apparatus 100A in accordance with the hacking program instead of an existing control program.

For example, the hacked main controller 120 may take a photograph of an external object by activating the camera 140 and deactivates the display 130 so that an image taken by the camera 140 may not be displayed. The hacking program collects the user's personal information and privacy in a state that the user does not realize the photographing operation of the camera 140. In this case, the third power range may be a power range measured by the power measurer 111 when the camera 140 is activated and the display 130 is deactivated.

Accordingly, when power measured by the power measurer 111 is in the third power range, the power controller 114 in which a hacking program is not installed may cut off the power supply by turning off the switch 115. In other words, the power controller 114 determines a hacked state or an abnormal operating state based on the measured power and forcibly cuts off the power supply to the main controller 120 etc. so that the hacked state or the abnormal operating state may be halted.

FIG. 4 shows the states of the display apparatus 100A according to another exemplary embodiment. In FIG. 4, the states corresponding to the power ranges consumed by the display apparatus 100A are shown.

The first power range is a power range measured when the display 130 and the camera 140 are turned off. In other words, the first power range may be a power range defined by the power consumed by the display apparatus 100A in the sleep state. The sleep state is an inactive state of the display apparatus 100A, and may indicate a state before the power controller 114 transmits a power supply signal to the power supplier 112.

The second power range is a power range defined by the power consumed when the display 130 is turned on and the camera 140 is turned off or when the display 130 and the camera 140 are both turned on. In other words, the second power range may be a power range by the power that the display apparatus 100A consumes in the normal operating state. The normal operating state is a state that the display apparatus 100A normally operates in, and may indicate a state where the display apparatus 100A boots up and content is displayed or a state where both content is being displayed on the display and the camera 140 takes a photograph.

The third power range is a power range measured when the display 130 is turned off and the camera 140 is turned on. When the display apparatus 100A is hacked into, the hacked main controller 120 controls the display 130, the camera 140, and other components in accordance with an installed hacking program as described above. In this case, the hacked main controller 120 may turn off the display 130 and turn on the camera 140. Accordingly, the third power range may be defined by what the display apparatus 100A consumes in the hacked state or the abnormal operating state which may be between the first power range and the second power range.

The specific figures of the power ranges shown in FIG. 4 are merely examples. Specific power ranges according to the sleep state, hacked state, and normal operating state of the display apparatus 100A may be measured and set for each display apparatus 100A and be stored in the storage 113.

The conditions regarding the states of the display apparatus 100A shown in FIG. 4 are merely examples. For example, in the sleep state of the display apparatus 100A, the display 130 and the main controller 120 are turned off, in the normal operating state, the display 130 and the main controller 120 are turned on, and in the hacked state, the display 130 is turned off and the main controller 120 is turned on.

Figure 5:
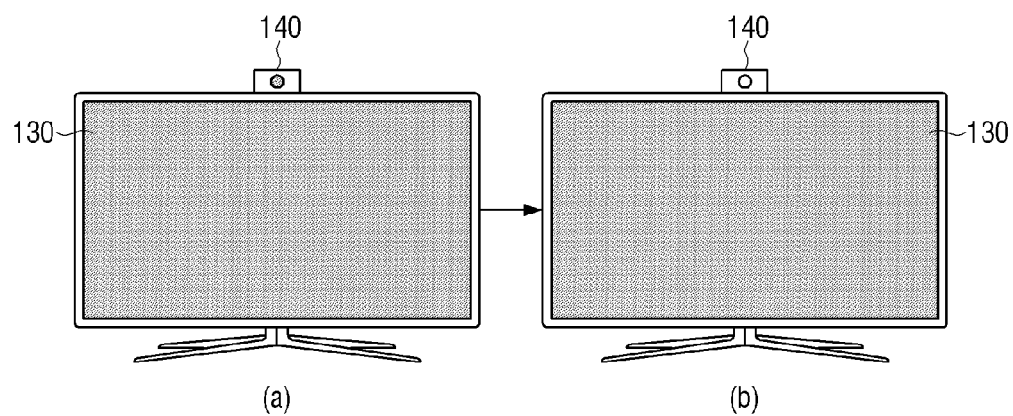
FIGS. 5 and 6 illustrate operations of the display apparatus according to one or more exemplary embodiments.
Figure 6:
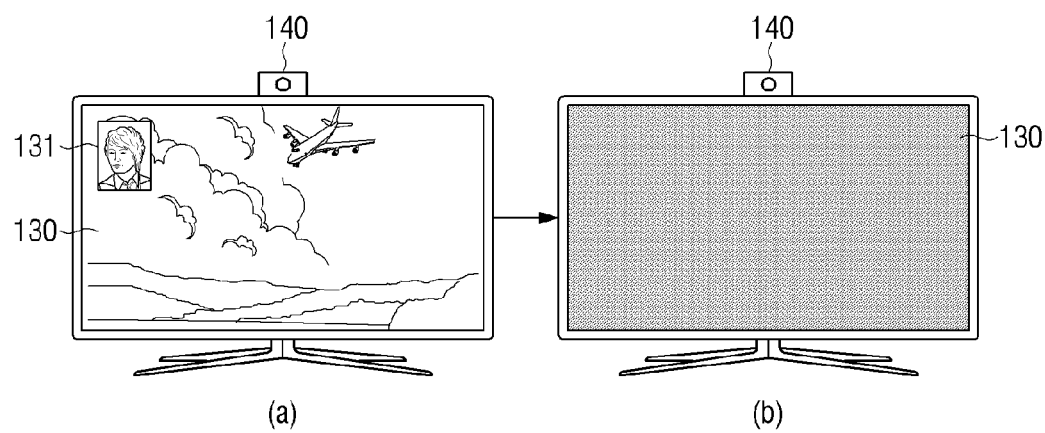

FIGS. 5 and 6 illustrate operations of the display apparatus 100A according to diverse exemplary embodiments.

FIG. 5 illustrates an example in which the display apparatus 100A in the sleep state operates in accordance with a hacking program. Particularly, FIG. 5 illustrates the display apparatus 100A in the sleep state in the left portion labeled (a), and also illustrates the display apparatus 100A in the hacked state or the abnormal state in the right portion labeled (b).

When the display apparatus 100A is in the sleep state as shown portion (a), the display 130 and the camera 140 are turned off. In this state, a hacking program installed in the main controller 120 may begin operating.

In this case, the main controller 120 activates the camera 140 in accordance with the hacking program. In order to conceal operation of the camera 140 from the user, the hacked main controller 120 deactivates the display 130 as shown in portion (b) so that the display 130 may not display an image taken by the camera 140.

Thus, power measured by the power measurer 111 is power measured when the camera 140 is turned on and the display 130 is turned off. Accordingly, the power controller 114 may determine that the display apparatus 100A is in the hacked state or the abnormal operating state as shown in FIG. 4. As a result, the power controller 114 cuts off the power supply by turning off the switch 115. Thus, the camera 140 is turned off and does not take a photograph.

FIG. 6 illustrates an example in which the display apparatus 100A in the normal operating state operates in accordance with a hacking program. Particularly, FIG. 6 illustrates the display apparatus 100A in the normal operating state in the left portion labeled (a), and also illustrates the display apparatus 100A in the hacked state or the abnormal state in the right portion labeled (b).

When the display apparatus 100A is in the normal operating state, the display 130 is turned on and the camera 140 is turned off or both the display 130 and the camera 140 are turned on. In particular, when the camera 140 is turned on to take a photograph, an on-screen display (OSD) 131 may be provided to display an image taken by the camera 140 on a portion of the display screen as shown in portion (a). In this state, a hacking program installed in the main controller 120 may begin operating.

In this case, the main controller 120 activates the camera 140 in accordance with the hacking program. In order to conceal operation of the camera 140 from the user, the hacked main controller 120 deactivates the display 130 as shown in portion (b) so that the display 130 may not display an image taken by the camera 140.

Thus, power measured by the power measurer 111 is power measured when the camera 140 is turned on and the display 130 is turned off. Accordingly, the power controller 114 may determine that the display apparatus 100A is in the hacked state or the abnormal operating state as shown in FIG. 4. As a result, the power controller 114 cuts off the power supply by turning off the switch 115. Thus, the camera 140 is turned off and does not take a photograph.

Using this method, the power controller 114 may prevent malfunction of the display apparatus 100A by a hacking program.

Figure 7:
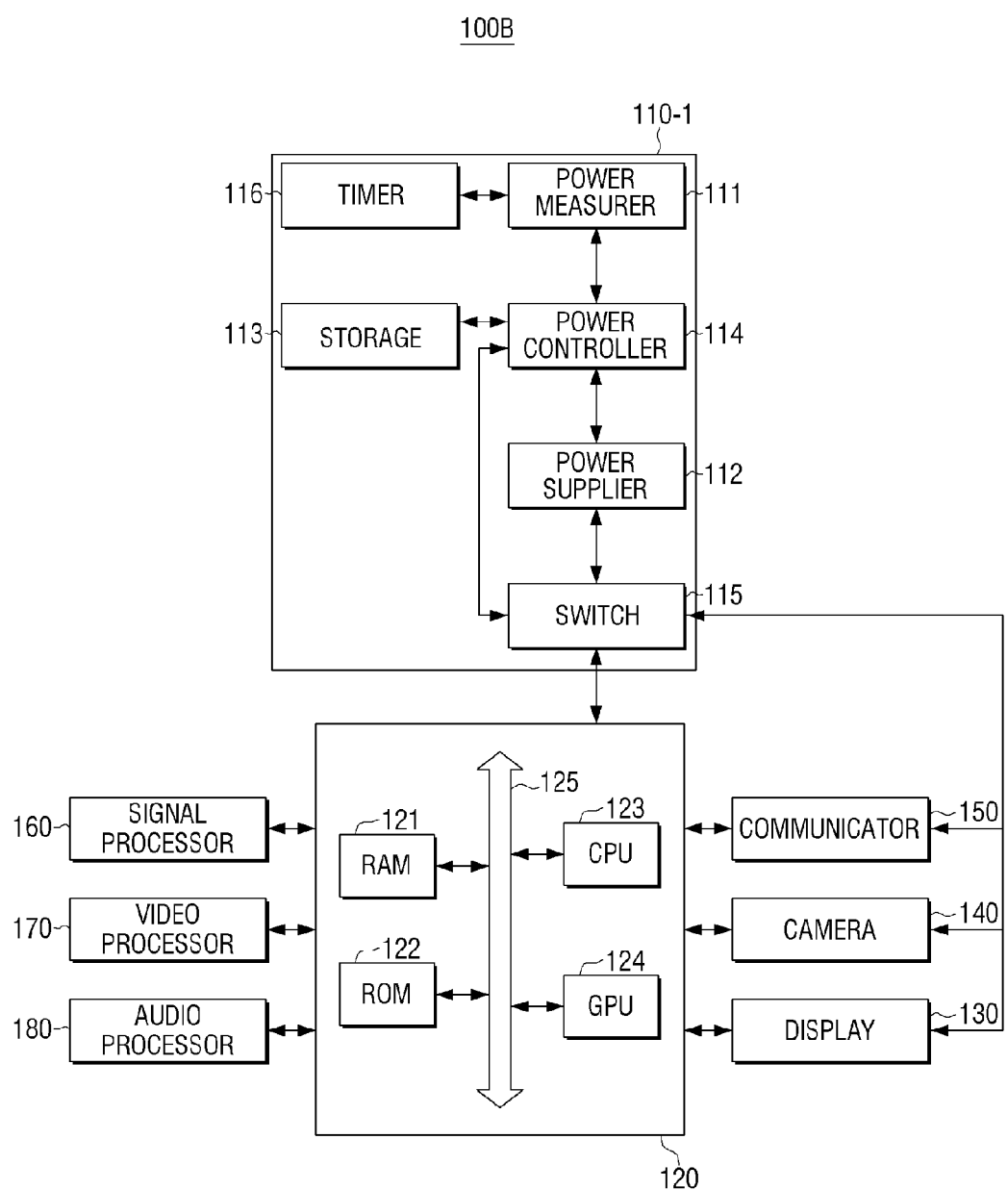
FIG. 7 is a block diagram of a configuration of a display apparatus according to yet another exemplary embodiment.

FIG. 7 is a block diagram of a configuration of a display apparatus 100B according to yet another exemplary embodiment. With reference to FIG. 7, the display apparatus 100B may include a power unit 110-1, a main controller 120, a display 130, and a camera 140. Additionally, the display apparatus 100B may also include a communicator 150, a signal processor 160, a video processor 170, and an audio processor 180. Description of a portion which overlaps with the aforementioned description is not repeated here.

Because the power unit 110-1 has been described with reference to FIG. 3, detailed description is not repeated.

The display 130 displays diverse images such as digital content and photographed images. The display 130 may be implemented with diverse kinds of displays such as a liquid crystal display (LCD), an organic light emitting diode (OLED) display, a plasma display panel (PDP), etc. The display 130 may include a driving circuit such as an a-si thin film transistor (TFT), a low temperature poly silicon (LTPS) TFT, and an organic TFT (OTFT), and a backlight unit.

The storage 113 stores diverse programs and data used to operate the display apparatus 100B. The main controller 120 controls overall operation of the display apparatus 100B using the diverse programs and data stored in the storage 113.

In addition, the storage 113 stores information regarding power ranges. Specifically, information regarding the first power range stored in the storage 113 may be power information regarding the display apparatus 100B in the sleep state. Information regarding the second power range may be power information regarding the display apparatus 100B in the normal operating state. Accordingly, the power controller 114 may determine whether to cut off the power supply by comparing power measured by the power measurer 111 with the power information stored in the storage 113.

According to another exemplary embodiment, the power measurer may be hardwired with a circuit that is configured to only trigger and generate a detection signal when within the third power range that falls above the first power range and below the second power range. Accordingly, when the circuit triggers and generates a signal, that signal can be transmitted to the power controller indicating that the third power range has been detected. The power controller can then control the display apparatus accordingly.

The communicator 150 communicates with diverse kinds of external devices or servers according to diverse types of communication methods. The communicator 150 may include a wireless fidelity (Wi-Fi) chip, a Bluetooth chip, a wireless communication chip, and a near field communication (NFC) chip.

The Wi-Fi chip and the Bluetooth chip perform communication in Wi-Fi method and Bluetooth method respectively. In the case of using the Wi-Fi chip or the Bluetooth chip, diverse connection information such as a subsystem identification (SSID) and a session key are transmitted and received first, and then after communication is connected, diverse information can be transmitted and received. The wireless communication chip is a chip that performs communication according to diverse communication standards such as IEEE, Zigbee, $3^{rd}$ generation (3G), $3^{rd}$ generation partnership project (3GPP), and long term evolution (LTE). The NFC chip is a chip that operates in the NFC method which uses a 13.56 MHz band among diverse radio frequency identification (RFID) frequency bands such as 135 kHz, 13.56 MHz, 433 MHz, 860-960 MHz, and 2.45 GHz.

Hacked data may be transmitted to an external device or a server through the communicator 150. Accordingly, the hacked main controller 120 may take a photograph of an external image by activating the camera 140, and transmit the taken external image data to an external device or a server by activating the communicator 150. Therefore, the third power range may be a power range that the display apparatus 100B consumes when the camera 140 and the communicator 150 are turned on and the display 130 is turned off. When measured power is within the third power range, the power controller 114 cuts off the power supply by turning off the switch 115.

The signal processor 160 receives and processes a broadcast signal so that the broadcast signal may be converted into video data, audio data, and other data. When a broadcast signal is received, the signal processor 160 generates a video frame and an audio signal by performing processing of the signal such as demodulation, equalization, demultiplexing, deinterleaving, decoding, etc. The generated video frame is transmitted to the display 130, and the generated audio signal is transmitted to a speaker.

The video processor 170 processes video data included in a broadcast signal received through the signal processor 160. That is, the video processor 170 may perform diverse image processing for video data such as decoding, scaling, noise filtering, frame rate conversion, resolution conversion, etc. In this case, the display 130 displays an image frame generated by the video processor 170.

The audio processor 180 processes audio data included in a broadcast signal received through the signal processor 160. The audio processor 180 may perform diverse processing for audio data such as decoding, amplification, noise filtering, etc.

The main controller 120 controls overall operation of the display apparatus 100B using diverse programs and data stored in the storage 113. The main controller 120 may include a random-access memory (RAM) 121, a read-only memory (ROM) 122, a central processing unit (CPU) 123, a graphics processing unit (GPU) 124, and a bus 125. The RAM 121, the ROM 122, the CPU 123, and the GPU 124 may be connected to one another via the bus 125.

The CPU 123 accesses the storage 113 and boots up the system using an operating system (OS) stored in the storage 113. In addition, the CPU 123 performs diverse operations of the display apparatus 100B using diverse programs, content, and data stored in the storage 113. The ROM 122 stores a set of commands to boot up the system. When a turn-on command is input and the power is supplied, the CPU 123 copies an operating system (OS) stored in the storage 113 to the RAM 121 according to the commands stored in the ROM 122 and runs the OS so that the system can boot up. When the boot-up is complete, the main CPU 123 copies diverse programs stored in the storage 113 to the RAM 121, and runs the copied programs so that diverse operations can be performed.

When the boot-up of the display apparatus 100B is complete, the GPU 124 displays an image. More specifically, the GPU 124 generates a screen including diverse objects such as icons, images, and text, using an operator and a renderer. The operator operates property values of each object, such as a coordinate value, shape, size and color, according to layout of the screen. The renderer generates a screen having diverse layout including objects based on the property values operated by the operator. The screen generated by the renderer is transmitted to the display 130 and is displayed on a display area of the display 130.

The control method of the display apparatus according to the diverse exemplary embodiments may be stored in a non-transitory computer readable medium. The non-transitory computer readable medium may be mounted in diverse kinds of devices.

For example, a program code to perform a control method control method of a display apparatus including measuring power supplied to the display apparatus, and cutting off the supplied power when the measured power is within a third power range which is between a first power range that the display apparatus consumes in a sleep state and a second power range that the display apparatus consumes in a normal state may be stored in a non-transitory computer readable medium and executed by computer or processor.

The non-transitory computer readable medium is a medium which does not store data temporarily such as a register, cash, and memory but stores data semi-permanently and is readable by devices. More specifically, the non-transitory computer readable medium may include compact disks (CDs), digital video disks (DVDs), hard disks, Blu-ray disks, universal serial buses (USBs), memory cards, and read-only memory (ROM)

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus comprising:
a camera;
a display;
a main controller configured to control operation of the display;
a power supplier configured to supply power to operate the display and the main controller;
a power measurer configured to measure the power supplied by the power supplier;
a storage configured to store information regarding a third power range which is between a first power range that the display apparatus consumes in a sleep state and a second power range that the display apparatus consumes in a normal state; and
a power controller configured to cut off the power supplied by the power supplier in response to the measured power being within the third power range,
wherein a power consumption of the display apparatus is within the third power range when the display is turned off, the main controller is turned on, and when the camera is activated.

2. The display apparatus as claimed in claim 1, further comprising:
a timer configured to measure a time elapsed from when the measured power is within the third power range,
wherein the power controller is further configured to cut off the power supplied by the power supplier in response to the time measured by the timer exceeding a critical time.

3. The display apparatus as claimed in claim 1, further comprising:
a switch configured to electrically connect the main controller and the power supplier,
wherein the power controller is further configured to turn off the switch to electrically disconnect the main controller and the power supplier in response to the measured power being within the third power range.

4. The display apparatus as claimed in claim 3,
wherein the first power range is measured when the display and the main controller are turned off,
wherein the second power range is measured when the display and the main controller are turned on, and
wherein the third power range is measured when the display is turned off and the main controller is turned on.

5. The display apparatus as claimed in claim 1, further comprising:
a communicator configured to communicate with an external device,
wherein the third power range is a power range that the display apparatus consumes when the camera and the communicator are activated.

6. A control method of a display apparatus, the method comprising:
measuring power supplied to the display apparatus;
cutting off the supplied power in response to the measured power being within a third power range which is between a first power range that the display apparatus consumes in a sleep state and a second power range that the display apparatus consumes in a normal state, and when a camera of the display apparatus is activated.

7. The method as claimed in claim 6, further comprising:
measuring a time elapsed from when the measured power is within the third power range,
wherein the cutting off the supplied power comprises cutting off the supplied power in response to the measured time exceeding a critical time.

8. The method as claimed in claim 6,
wherein the first power range is measured when a display configured to display content and a main controller configured to control the display are turned off,
wherein the second power range is measured when the display and the main controller are turned on, and
wherein the third power range is measured when the display is turned off and the main controller is turned on.

9. The method as claimed in claim 6, further comprising:
communicating with an external device,
wherein the third power range is a power range that the display apparatus consumes when the camera and the communicator are activated.

10. A display apparatus comprising:
a camera;
a display;

a main controller;

a power measurer configured to detect power provided by a power supplier to components of the display apparatus; and a power controller configured to determine whether the detected power is in a hacked power range between a first power range and a second power range, and when the detected power is in the hacked power range, control the power supplier to cut off the power to the components of the display apparatus, wherein a power consumption of the display apparatus is within the hacked power range when the display of the display apparatus is turned off and the main controller of the display apparatus is turned on, and when the camera of the display apparatus is activated.

11. The display apparatus of claim 10, wherein the first power range is defined by a first lower boundary that is equal to no power consumption and a first upper boundary that is equal to power consumption when all components including the display are in a sleep mode, wherein the second power range is defined by a second lower boundary equal to power consumption when the display is operating along with a main controller and a second upper boundary that is equal to all components operating including the display and main controller.

12. The display apparatus of claims 11, wherein the hacked power range is defined by the first upper boundary of the first power range, which equals the hacked lower boundary, and the second lower boundary of the second power range, which equals the hacked upper boundary.

13. The display apparatus of claim 10, wherein the components of the display apparatus includes at least one of a communicator, a signal processor, a video processor, and an audio processor.

14. The display apparatus of claim 1, wherein the third power range has an upper boundary and a lower boundary, the upper boundary is determined according to a power consumption when the display and the main controller are turned on, and the lower boundary is determined according a power consumption when the second power range is measured when the display and the main controller are turned off.

* * * * *